United States Patent [19]

Sagara

[11] Patent Number: 5,143,168
[45] Date of Patent: Sep. 1, 1992

[54] STEERING GEAR RACK AND TRANSFER PINION ARRANGEMENT FOR FOUR-WHEEL DRIVE VEHICLE DERIVED FROM TRANSVERSELY MOUNTED FRONT ENGINE-FRONT DRIVE SYSTEM

[75] Inventor: Kiyoshi Sagara, Kanagawa, Japan

[73] Assignee: Nissan Motor Co., Ltd., Yokohama, Japan

[21] Appl. No.: 670,925

[22] Filed: Mar. 18, 1991

[30] Foreign Application Priority Data

Apr. 24, 1990 [JP] Japan .................................. 2-108152

[51] Int. Cl.⁵ .......................................... B60K 17/344
[52] U.S. Cl. .................................. 180/374; 180/248; 180/376
[58] Field of Search ............... 180/248, 233, 234, 374, 180/376, 383, 348

[56] References Cited

U.S. PATENT DOCUMENTS 4,726,254  2/1988  Kubo et al. ..................... 180/248 X

FOREIGN PATENT DOCUMENTS 34228  2/1988  Japan .................................. 180/374
16834  1/1991  Japan .................................. 180/376

Primary Examiner—Charles A. Marmor
Assistant Examiner—Kevin Hurley
Attorney, Agent, or Firm—Foley & Lardner

[57] ABSTRACT

A four-wheel drive vehicle derived from a transversely mounted front engine-front drive system incorporates an improved steering gear rack and transfer pinion arrangement in which an axis of a transfer pinion is disposed higher than an axis of a transfer ring gear or differential gear of a transaxle and a steering gear rack is disposed lower than the transfer pinion.

8 Claims, 3 Drawing Sheets

STEERING GEAR RACK AND TRANSFER PINION ARRANGEMENT FOR FOUR-WHEEL DRIVE VEHICLE DERIVED FROM TRANSVERSELY MOUNTED FRONT ENGINE-FRONT DRIVE SYSTEM

BACKGROUND OF THE INVENTION

1. Field of the Invention

The present invention relates in general to a four-wheel drive vehicle derived from a transversely mounted front engine-front drive system and more particularly to a steering gear rack and transfer pinion arrangement for such a four-wheel drive vehicle.

2. Description of the Prior Art

An example of a prior art steering gear rack and transfer pinion arrangement for a four-wheel drive vehicle of the above described kind is shown in FIG. 3. In this arrangement, a steering gear rack 10 is disposed lower than an axis L1 of a transfer ring gear 12 and an axis L2 of a transfer pinion 14 or a propeller shaft 16. The axes L1 and L2 are disposed at substantially the same level or the same height-above-the ground. L3 is a level representing an upper termination of a ground clearance of a front suspension lower control arm 18. 16a and 16b indicate a front pivot and rear pivot of the lower control arm 18, respectively.

Another example of a prior art steering gear rack and transfer pinion arrangement is shown in FIG. 4. In this arrangement, the axis L2 of the transfer pinion 14 or propeller shaft 16 is disposed lower than the axis L1 of the transfer ring gear 12, i.e., the axis L2 is offset dowardly from the axis L1 by a distance α1.

A problem of the arrangement of FIG. 3 is that due to the disposition of the steering gear rack 10 at a location lower than the axes L1 and L2, an engine (not shown), transaxle 20, etc. are necessarily disposed at high levels-above-the ground, i.e., necessarily disposed to have large ground clearances, resulting in the necessity of disposing a hood at a correspondingly high level-above-the ground.

This problem can be solved by the arrangement of FIG. 4. However, this arrangement is disadvantageous since due to the disposition of the steering gear rack 10 above the propeller shaft 16, it causes a large roll steer, thus deteriorating the steering characteristics and therefore the running stability of the vehicle.

SUMMARY OF THE INVENTION

In accordance with the present invention, there is provided an improved four-wheel drive vehicle which comprises an engine transversely mounted at a front, a transaxle joined with the engine to constitute a power unit and having a differential gear for transmitting engine power to front wheels, a transfer ring gear operatively connected with the transaxle for taking out engine power therefrom, a transfer pinion meshing with the tranfer ring gear for transmitting engine power to rear wheels, and a steering gear rack adjacent to the transfer pinion. The above structure may follow the convention fashion.

In accordance with the present invention, an axis of the transfer pinion is disposed higher than an axis of the transfer ring gear, and the steering gear rack is disposed lower than the transfer pinion.

The above arrangement of this invention can solve the above noted problems inherent in the prior art arrangements.

It is accordingly an object of the present invention to provide a four-wheel drive vehicle incorporating a steering gear rack and transfer pinion arrangement which makes it easy to dispose a steering gear rack between a transfer pinion and a lower control arm of a front suspension, without increasing the ground clearance of a power unit, etc. or without deteriorating the steering characteristics.

It is another object of the present invention to provide a four-wheel drive vehicle incorporating a steering gear rack and transfer pinion arrangement of the above described character which can increase the design freedom of the vehicle.

It is a further object of the present invention to provide a four-wheel drive vehicle incorporating a steering gear rack and transfer pinion arrangement of the above described character which can improve the running stability of the vehicle.

DESCRIPTION OF THE PREFERRED EMBODIMENT

Figure 1:
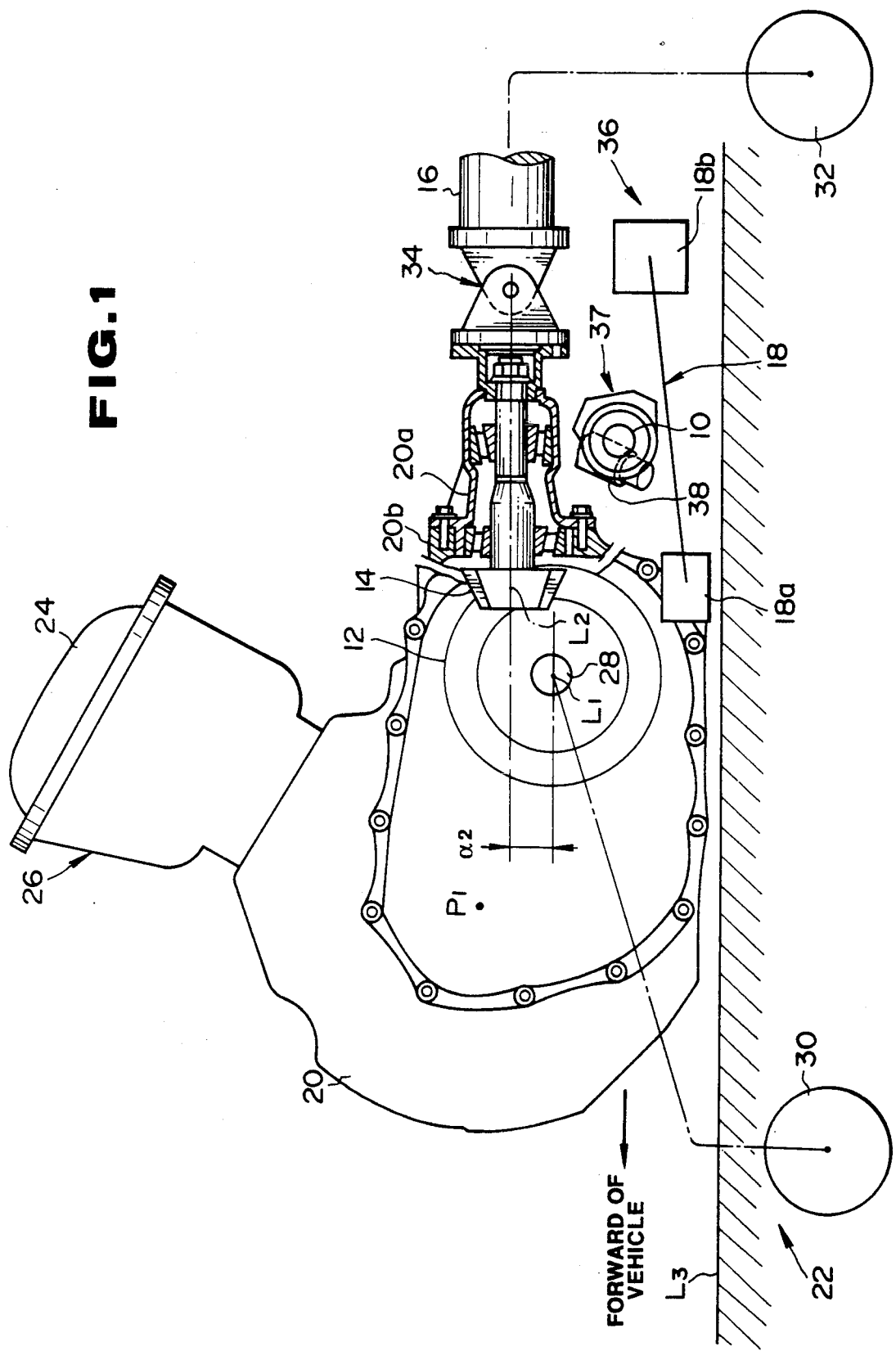
FIG. 1 is a schematic side elevational view of a four-wheel drive vehicle incorporating a steering gear rack and transfer pinion arrangement according to the present invention.
Figure 3:
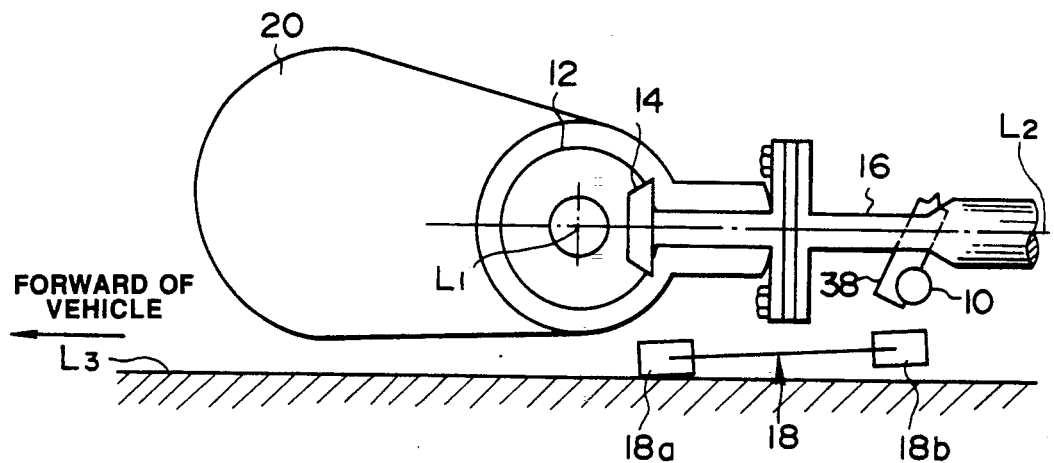
FIG. 3 is a schematic side elevational view of a prior art steering gear rack and transfer pinion arrangement.
Figure 4:
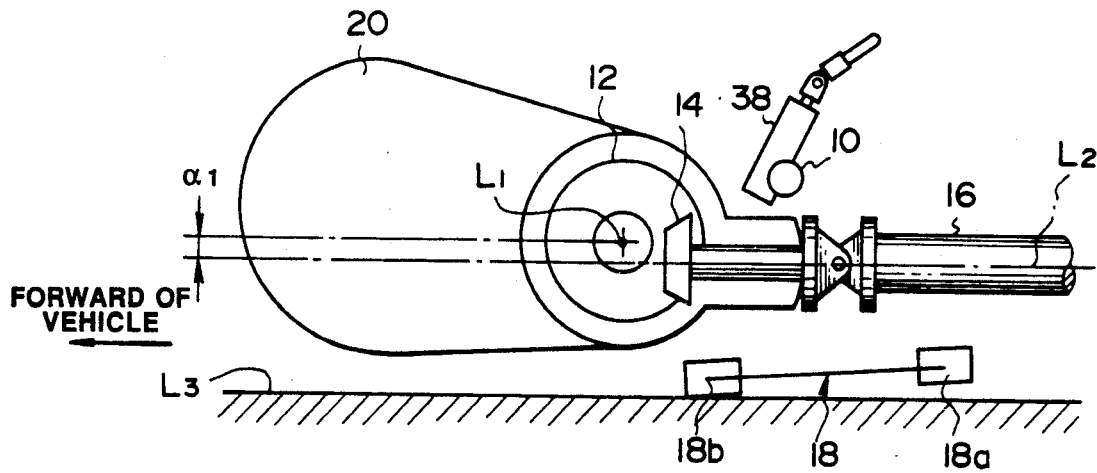
FIG. 4 is a view similar to FIG. 3 but shows another prior art steering gear rack and transfer pinion arrangement.

Referring to FIG. 1, in which like or corresponding parts to those of the prior art arrangements of FIGS. 3 and 4 are designated by the same reference characters, a four-wheel drive vehicle 22 inclds an engine 24 which is transversely mounted at the front thereof and joined with a transaxle 20 to constitute a power unit 26. Engine power is transferred through a differential gear 28 of the trasaxle 20 to front wheels 30 and through a transfer ring gear 12, a transfer pinion 14 meshed with the transfer ring gear 12, a propeller shaft 16, etc. to rear wheels 32. The transfer ring gear 12 is disposed coaxially with the differential gear 28 the transaxle 20 and drivingly connected to a transmission section of the transaxle 20. The transfer pinion 14 is connected to the propeller shaft 16 by way of a joint 34 such as a universal joint. A front suspension 36 includes a lower control arm 18 disposed higher than a predetermined level-above-the ground L3. A steering gear 37 is of the rack and pinion type and includes a steering gear rack 10 disposed between a transfer casing 20a and the lower control arm 18 of the front suspension 36 and elongated transversely of the vehicle 22. The transfer casing 20a receives therewithin the transfer pinion 14 and is secured to a casing 20b of the transaxle 20. The steering gear 37 further inclues a steering gear pinion 38 rotatable with a steering wheel (not shown) and meshed with the steering gear rack 10 such that rotation of the steering gear pinion 38 causes the steering gear rack 10 to reciprocate transversely of the vehicle 22 for thereby causing the front wheels 30 to swivel to the left and right.

More specifically, the differential gear 28 is arranged to have an axis extending transversely of the vehicle 22. In this connection, the axis L1 of the transfer ring gear 12 extends transversely of the vehicle 22 while the axis L2 of the transfer pinion 14 extends longitudinally of the vehicle 22. P1 indicates an engine center or crankshaft center.

The above structure may be obtained in the conventional manner. In accordance with the present invention, the axis L1 of the transfer ring gear 12 coaxial with the differential gear 28 of the transaxle 20 is disposed lower than the axis L2 of the transfer pinion 14, that is, the axes L1 and L2 are vertically offset by a predetermined distance $\alpha2$ in such a way that the axis L2 is located higher than the axis L1.

From the foregoing, it will be understood that the arrangement of this invention makes it possible to form a larger or increased space between the trasfer casing 20a and the lower control arm 18 of the front suspension 38, thus making it easy to dispose the steering gear rack 10 between the transfer casing 20a and the lower control arm 18 of the front suspension 38, without increasing the ground clearance or height-above-the ground of the power unit 26, hood etc. The engine 24, transaxle 20, etc. can therefore be disposed at lower levels-above-the ground, thus making it possible to lower the level-above-the ground of the hood, i.e., making it possible to increase the design freedom of the vehicle.

It will be further understood that since the steering gear rack 10 is disposed lower than the axis L2 of the transfer pinion 14 or propeller shaft 16 the steering gear rack and transfer pinion arrangement of this invention does not cause an undesirable large roll steer, which will be described hereinbelow with reference to the graph of FIG. 2.

Figure 2:
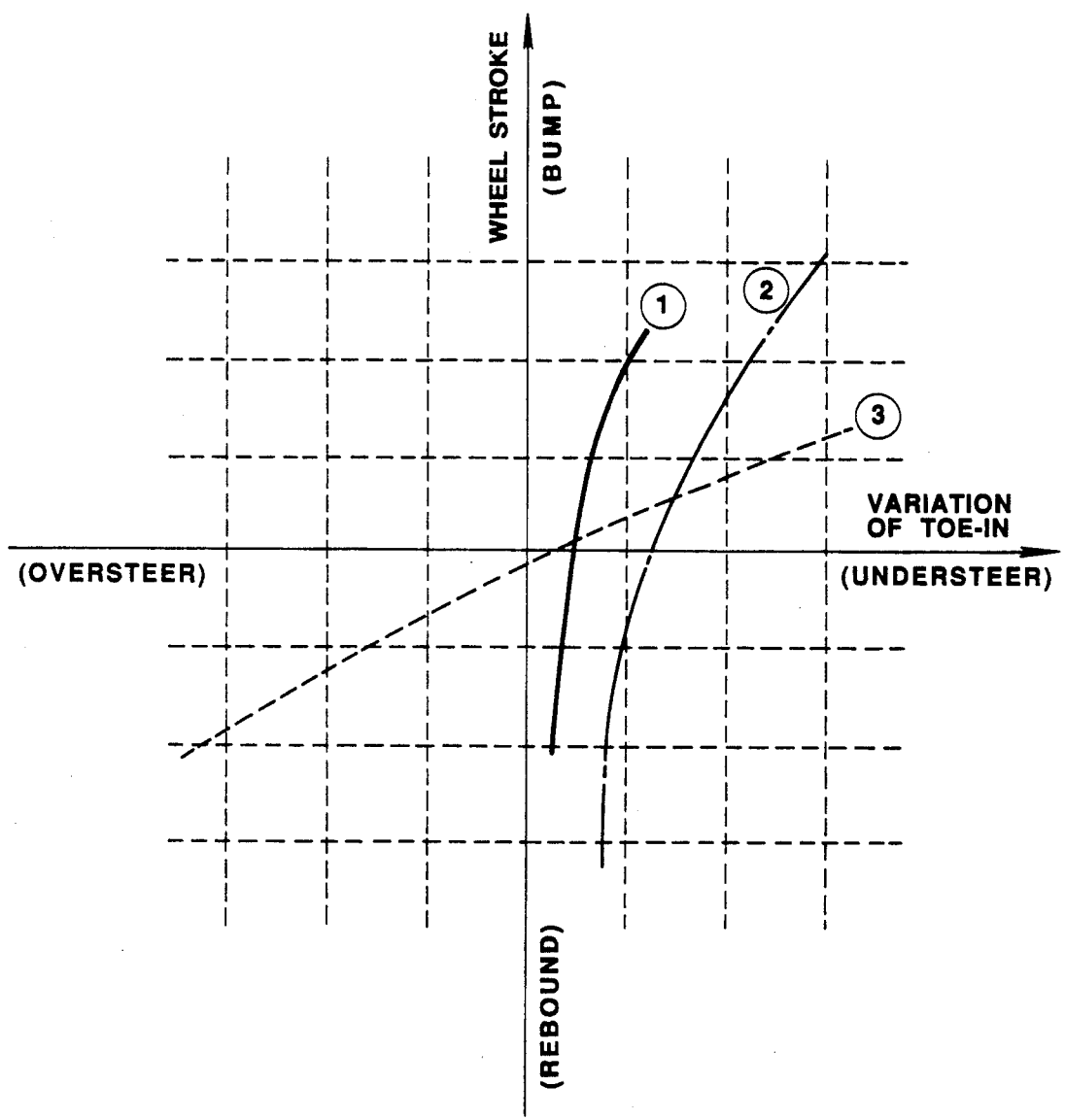
FIG. 2 is a graph of steering characteristics attained by the arrangement of FIG. 1, together with those attained by the arrangements of FIGS. 3 and 4 for comparision.

Referring to FIG. 2, a solid line curve ① represents steering characteristics attained by the steering gear rack and transfer pinion arrangement of o this invention, a one-dot chain line curve ② represents steering characteristics attained by the steering gear rack and transfer pinion arrangement of FIG. 3, and a dotted line curve ③ represents steering characteristics attained by the arrangement of FIG. 4.

As will be seen from this graph, as compared with the prior art arrangements of FIGS. 3 and 4, the arrangement of this invention can cause a less variation of toe-in and therefore a less variation of roll steer in response to a wheel stroke, i.e., movement of a wheel toward and away from a vehicle body. In this connection, "bump" is used for indicating movement of a wheel toward a vehicle body and "rebound" for movement of a wheel away from a vehicle body.

What is claimed is:

1. A four-wheel drive vehicle comprising:
   an engine transversely mounted at a front;
   a transaxle joined with said engine to constitute a power unit and having a differential gear for transmitting engine power to front wheels;
   a transfer ring gear operatively connected with said transaxle for taking out engine power therefrom;
   a transfer pinion meshing with said tranfer ring gear for transmitting engine power to rear wheels; and
   a steering gear rack adjacent to said transfer pinion;
   in which an axis of said transfer pinion is disposed higher than an axis of said transfer ring gear, and said steering gear rack is disposed lower than said transfer pinion.

2. A four-wheel drive vehicle as claimed in claim 1, further comprising a front suspension having a lower control arm, said steering gear rack being disposed between said lower control arm of said front suspension and said transfer pinion.

3. A four-wheel drive vehicle as claimed in claim 2, further comprising a transfer casing receiving therewithin said transfer pinion and attached to a casing of said transaxle, said steering gear rack being disposed between said lower control arm and said transfer casing.

4. A four-wheel drive vehicle as claimed in claim 3, wherein said steering gear rack is elongated transversely of the vehicle.

5. A four-wheel drive vehicle as claimed in claim 4, wherein said transfer ring gear is drivingly connected with said trasaxle.

6. A four-wheel drive vehicle as claimed in claim 5, wherein said differential gear is disposed to have an axis extending transverly of the vehicle.

7. A four-wheel drive vehicle as claimed in claim 6, wherein said axis of said transfer pinion extends longitudinally of the vehicle.

8. A four-wheel drive vehicle as claimed in claim 7, further comprising a propeller shaft drivingly connected with said transfer pinion.

* * * * *